Patented Nov. 12, 1929

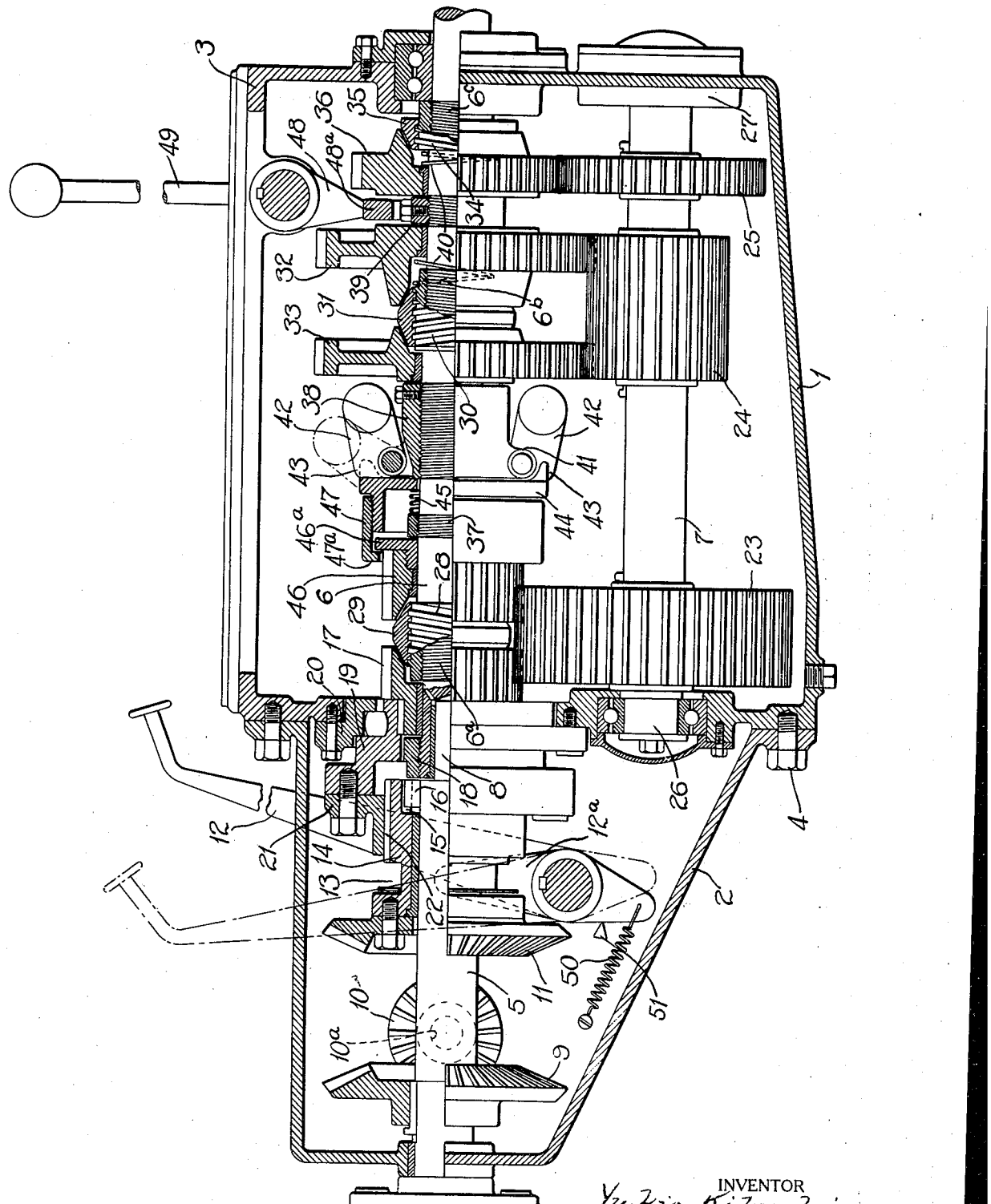

1,735,578

UNITED STATES PATENT OFFICE

YUKIO KIKUCHI, OF MONTCLAIR, NEW JERSEY

GEAR TRANSMISSION

Application filed July 7, 1928. Serial No. 291,052.

This invention relates to transmissions for use in transmitting the power from a power shaft to a shaft to be driven, and particularly to an apparatus of this class involving a simple method of shifting the several speeds of the transmission; and the object of the invention is to provide a transmission of the class specified comprising a power shaft, a driven shaft in axial alinement with the power shaft, and a supplemental shaft arranged in parallel relation to the first named shafts, and means involving a single shifting device cooperating with clutch elements having gear faces, for moving said elements into position to be coupled with the driven shaft through clutch members in the first and second speed drives of the driven shaft as well as in the reverse drive thereof; a further object being to provide governor actuated means on the driven shaft and cooperating with a clutch device for directly coupling the power shaft with the driven shaft in the third or high speed drive of the transmission; a further object being to provide means for controlling the directional drive of the driven and supplemental shafts, said means also serving to automatically uncouple the clutch faces controlling the first, second and third speed drives of the driven shaft in the operation of shifting from a forward to a reverse drive; and with these and other objects in view, the invention consists in a transmission of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters, and in which:

The drawing is a sectional and side view of a transmission made according to my invention.

In the accompanying drawing, the mechanism of the transmission is arranged within two casings 1 and 2, the casing 1 having a top or cover part 3, whereas the casing 2 is open at one side adjacent the casing 1 and is secured to said casing and the cover 3 by screws or other devices 4.

In the drawing, 5 represents the power shaft, 6 the driven shaft and 7 a supplemental driven shaft arranged within the casing 1 and in parallel relation to the shaft 6. The inner end of the shaft 5 is provided with a reduced extension 8 which seats in a bore formed in the adjacent end of the shaft 6.

Keyed to the shaft 5 within the casing 2 is a beveled gear 9 in constant mesh with a beveled gear supported on a suitable stub shaft indicated at $10^a$, at one side of the casing 2. Rotatably mounted on the shaft 5 is another beveled gear 11 adapted to be moved into engagement with the gear 10 through a foot lever 12, the arm $12^a$ of which cooperates with an annular groove 13 formed in a clutch sleeve 14 to which the gear 11 is secured. The inner end of the sleeve 14 is provided with an internal clutch face 15 adapted to engage a clutch member 16 secured to the shaft 5, said parts being shown in operative engagement in the drawing.

Rotatably mounted on the shaft 6 is a gear 17 held against longitudinal movement on the shaft by a shoulder portion formed on the shaft and a retaining nut 18 in threaded engagement with the shaft. The gear 17 is keyed to one part 19 of a ball or roller bearing, the other part 20 of said bearing being secured to the casing 1 and cover 3, and the part 19 of the bearing carries a cap 21 keyed to the sleeve 14 by an elongated key way 22 maintaining the sleeve 14 in constant operative engagement with the cap 21 in the several positions thereof.

The gear 17 is in constant mesh with a wide faced gear 23 keyed to the shaft 7, and another wide faced gear 24 is secured to said shaft in spaced relation to the gear 23, and a third narrow faced gear 25 is also secured to the shaft outwardly of but adjacent the gear 24. The shaft 7 is arranged in suitable bearings 26 and 27 in the casing 1.

Secured to the threaded portion $6^a$ of the shaft 6 is a feed screw 28 in connection with which a double faced clutch member 29 operates to feed longitudinally of the shaft in engaging and disengaging the gear 17.

Mounted on another threaded portion 6ᵇ of the shaft 6 is a similar feed screw 30 in connection with which another double faced clutch member 31 operates, and is movable longitudinally of the shaft toward and from two clutch elements 32 and 33, both having gear faces meshing with the wide faced gear 24. Mounted on another threaded portion 6ᶜ of the shaft 6 is another feed screw 34 on which is mounted a single faced clutch member 35 adapted to engage the clutch element 36 having a gear face meshing with the gear 25.

The feed screws 28, 30 and 34 are all in the form of sleeves, and the pitch of the screws on the periphery thereof are such as to advance their respective clutch members in the direction of the gears or clutch elements to produce the desired forward and reverse drive as later described. In threaded engagement with the shaft 6 are retaining collars 37, 38 and 39, the collar 39 serving to maintain the elements 32 and 36 in spaced relation, and serving as a backing for said elements in the operation of coupling the same with the shaft 6. Springs 40 are employed to support the elements 32 and 36 normally out of engagement with the clutch members 31 and 35.

The collar 38 is provided with two pair of oppositely disposed and outwardly projecting lugs 41 between which are pivotally supported weighted arms 42 forming a governor device thereof, said arms 42 having cam faces 43 adapted to cooperate with a member 44 slidably mounted on the shaft 6 and normally held in engagement with the arms 42 or the arm faces 43 thereof by a spring 45 which seats upon the collar 37.

The gear 46 is rotatably mounted on the shaft 6 adjacent the clutch member 29 and cooperates with said clutch member to advance it into engagement with the gear 17, the gear 46 being in mesh with the gear 23 as clearly seen in the drawing. The gear 46 has a projecting flange member 46ᵃ adapted to be engaged by the member 44 to advance the gear 46 in the direction of the clutch member 29 in the operation of the governor or in the outward movement of the weighted arms 42 of the governor, which position of said arms is indicated in dotted lines in the drawing. To prevent the gear 46 from moving into engagement with the clutch member 29, independent of the member 44, I provide a retaining collar 47 on the member 44 and having a flange 47ᵃ adapted to cooperate with the flange 46ᵃ of the gear 46.

Pivotally supported in connection with the top or cover 3 of the casing, is a gear shifting member 48 having a yoke-shaped end portion 48ᵃ disposed between the adjacent faces of the elements 32 and 36 and cooperating with said elements to move the same in the direction of the members 31 and 35 through the operation of a gear shifting lever 49, it being understood that in one movement of this lever, the element 32 is moved into engagement with the member 31, and in the opposite movement of the lever, the element 36 is moved into engagement with the member 35.

The lever or pedal 12 is normally held in the position shown in full lines in the drawing by a spring 50, in which position the beveled gear 11 is out of engagement with the gear 10 and a suitable stop 51 is employed to limit the movement of the gear 11 to the right as seen in the drawing.

The operation of my improved transmission will be readily understood from the foregoing description when taken in connection with the accompanying drawing and the following statement. The position of the several parts of the transmission shown in the accompanying drawnig is a neutral position, and assuming that the power shaft 5 is rotated, the gears 17, 46, 23, 24 and 25, and elements 32, 33 and 36 are rotated, and the shaft 6 is stationary or inoperable in this position of the parts.

When it is desired to move the gears into first or low speed position, the lever 49 is operated to advance the member 48 into engagement with the element 32 and moving said element or its beveled face into engagement with the adjacent beveled face of the clutch member 31, the element 32 being rotated in this position, causing the member 31 to be fed in the direction of the beveled face of the element 32, firmly coupling said element with the shaft 6 and causing said shaft to be driven therethrough.

In moving into second speed, the lever 49 is operated in the reverse direction, advancing the element 36 in the direction of the clutch member 35, bringing the beveled faces thereof into engagement, causing the element 36 to firmly engage the shaft 6 and to rotate the same therethrough, this operation automatically causing the element 32 to become disengaged by the shaft 6 by virtue of the differential rotation between the shaft and said element, the spring 40 aiding in separating the element 32 from the member 31.

In shifting into third or high speed, which is accomplished by the direct coupling of the shaft 6 with the shaft 5, this coupling automatically takes place when the speed of rotation of the shaft 6 through the second speed drive reaches a point sufficient to cause the cam faces 43 of the weighted governor arms 42 to move the gear 46 into engagement with the clutch member 29, causing said clutch member to feed to the left and into engagement with the gear 17 to firmly engage said gear and couple it with the shaft 6, causing said shaft to be driven directly or at high speed.

It will be understood that in the high speed drive of the shaft 6, the element 36 will automatically be disengaged from the member 35, but it is here to be noted that the lever 49 may be retained in the second speed position so that in the event that the direct drive on the shaft 6 is retarded and should become disengaged with the gear 17, then and in that event the second speed drive would automatically come into operation, and this automatic operation may be assisted by the operation of the lever 49 if found to be necessary.

In all of the forward speed drives, the gear 11 is in the position shown in full lines in the drawing. In the reverse drive of the transmission, the element 32 is actuated through the gear shifting lever to move it into engagement with the member 31, and the pedal 12 is depressed or moved into the dotted line position to bring the gear 11 into position to mesh with the gear 10 and to break the clutch engagement at 15—16 which operation will cause the shaft 6 to be driven in a reverse direction by the engagement of the element 33 with the member 31 which feeds on the screw 30 in the direction of the element 33 in this reverse drive.

It will also be understood that the driving of the shaft 6 may be broken at any time or in any of the several forward speed drives upon the depression of the pedal 12, breaking the clutch engagement 15 and 16. The forward driving progress of the shaft 6 may be further retarded by moving into a reverse drive position, it being understood that the frictional engagement between the parts will prevent any undue stress or strain thereon.

It will also be apparent that while I have shown a transmission which is primarily adapted for use in connection with motor vehicles, that the same may be used for other purposes, and modified to suit such purposes or uses, and still further, my invention is not necessarily limited to the specific construction and arrangement of parts herein shown and described, and various changes therein and modifications thereof may be made within the scope of the appended claims without departing from the spirit of my invention or sacrificing its advantages.

Having fully described my invention, what I claim as new and desire to secure by Letters Patent, is:—

1. A gear transmission of the class described, comprising a low speed driving unit, a second speed driving unit and a third and high speed driving unit, means involving a single control disposed between and cooperating with two of said units for moving both the first and second speed driving units into operative position, and automatically actuated means for moving the third or high speed driving unit into operative position.

2. A gear transmission of the class described, comprising a low speed driving unit, a second speed driving unit and a third or high speed driving unit, means involving a single control for moving both the first and second speed driving units into operative position, automatically actuated means for moving the third or high speed driving unit into operative position, and means involving clutch elements cooperating with the respective units whereby the operation of one unit will automatically cause the other unit or units to become inoperative.

3. A gear transmission of the class described comprising a low speed driving unit, a second speed driving unit and a third or high speed driving unit, means involving a single control for moving both the first and second speed driving units into operative position, automatically actuated means for moving the third or high speed driving unit into operative position, means involving clutch elements cooperating with the respective units whereby the operation of one unit will automatically cause the other unit or units to become inoperative, and means involving one of said clutch elements whereby the first or low speed driving unit may be utilized in producing the reverse drive of the transmission.

4. A transmission of the class described comprising a driven shaft and a supplemental shaft arranged in spaced and parallel relation to the driven shaft, gear and clutch transmitting units spaced longitudinally of the driven shaft and in constant engagement with gears on the supplemental shaft, means for placing the supplemental shaft in constant operative engagement with the power shaft, and automatically actuated means on the driven shaft and means involving the screw threaded engagement of the clutch element of one unit with the driven shaft and the gear of said unit for placing said unit into operative engagement with the driven shaft.

5. A transmission of the class described comprising a driven shaft and a supplemental shaft arranged in spaced and parallel relation to the driven shaft, gear and clutch transmitting units spaced longitudinally of the driven shaft and in constant engagement with gears on the supplemental shaft, means for placing the supplemental shaft in constant operative engagement with the power shaft, automatically actuated means on the driven shaft for moving one of said units into operative engagement with the driven shaft, and manually operated means disposed between two other of said units for actuating either of said units in coupling the same with the driven shaft and the clutch members of the last named units being in screw threaded engagement with the driven shaft.

6. A transmission of the class described comprising a driven shaft and a supplemental shaft arranged in spaced and parallel relation to the driven shaft, gear and clutch transmitting units spaced longitudinally of the driven shaft and in constant engagement with gears on the supplemental shaft, means for placing the supplemental shaft in constant operative engagement with the power shaft, automatically actuated means on the driven shaft for moving one of said units into operative engagement with the driven shaft, manually operated means disposed between two other of said units for actuating either of said units in coupling the same with the driven shaft and the clutch members of the last named units being in screw threaded engagement with the driven shaft, and one of said last named units including means for completing the coupling to the driven shaft in the reverse drive thereof.

7. A transmission of the class described comprising a driven shaft and a supplemental shaft arranged in spaced and parallel relation to the driven shaft, gear and clutch transmitting units spaced longitudinally of the driven shaft and in constant engagement with gears on the supplemental shaft, means for placing the supplemental shaft in constant operative engagement with the power shaft, automatically actuated means on the driven shaft for moving one of said units into operative engagement with the driven shaft, manually operated means disposed between two other of said units for actuating either of said units in coupling the same with the driven shaft, one of said last named means including means for completing the coupling to the driven shaft in the reverse drive thereof, and manually actuated means for controlling the forward and reverse drive of the driven and supplemental shafts.

8. A transmission of the class described comprising a driven shaft and a supplemental shaft arranged in spaced and parallel relation to the driven shaft, gear and clutch transmitting units spaced longitudinally of the driven shaft and in constant engagement with gears on the supplemental shaft, means for placing the supplemental shaft in constant operative engagement with the power shaft, automatically actuated means on the driven shaft for moving one of said units into operative engagement with the driven shaft, manually operated means disposed between two other of said units for actuating either of said units in coupling the same with the driven shaft, one of said last named units including means for completing the coupling to the driven shaft in the reverse drive thereof, manually actuated means for controlling the forward and reverse drive of the driven and supplemental shafts, said means comprising a beveled gear keyed to the power shaft, another beveled gear rotatably mounted on the power shaft and an intermediate gear for placing both of said beveled gears in operative engagement.

9. A transmission of the class described comprising a driven shaft and a supplemental shaft arranged in spaced and parallel relation to the driven shaft, gear and clutch transmitting units spaced longitudinally of the driven shaft and in constant engagement with gears on the supplemental shaft, means for placing the supplemental shaft in constant operative engagement with the power shaft, automatically actuated means on the driven shaft for moving one of said units into operative engagement with the driven shaft, manually operated means disposed between two other of said units for actuating either of said units in coupling the same with the driven shaft, one of said last named units including means for completing the coupling to the driven shaft in the reverse drive thereof, manually actuated means for controlling the forward and reverse drive of the driven and supplemental shafts, said means comprising a beveled gear keyed to the power shaft, another beveled gear rotatably mounted on the power shaft and an intermediate gear for placing both of said beveled gears in operative engagement, and means for keying the second named beveled gear to the power shaft in the forward drive of the transmission.

10. A transmission of the class described comprising a driven shaft and a supplemental shaft arranged in spaced and parallel relation to the driven shaft, gear and clutch transmitting units spaced longitudinally of the driven shaft and in constant engagement with gears on the supplemental shaft, means for placing the supplemental shaft in constant operative engagement with the power shaft, automatically actuated means on the driven shaft for moving one of said units into operative engagement with the driven shaft, manually operated means disposed between two other of said units for actuating either of said units in coupling the same with the driven shaft, one of said last named units including means for completing the coupling to the driven shaft in the reverse drive thereof, and all of said units involving clutch members in screw threaded engagement with the driven shaft and movable into engagement with the driving members of each unit in completing the coupling with said shaft.

11. A transmission of the class described comprising a driven shaft and a supplemental shaft arranged in spaced and parallel relation to the driven shaft, gear and clutch transmitting units spaced longitudinally of the driven shaft and in constant engagement with gears on the supplemental shaft, means for placing the supplemental shaft in constant operative engagement with the power shaft, automatically actuated means on the driven shaft for moving one of said units into operative engagement with the driven shaft, manually operated means disposed between two other of said units for actuating either of said units in coupling the same with the driven shaft, one of said last named units including means for completing the coupling to the driven shaft in the reverse drive thereof, all of said units involving clutch members in screw threaded engagement with the driven shaft and movable into engagement with the driving members of each unit in completing the coupling with said shaft, and said automatically actuated means comprising a governor, the operation of which is controlled by the speed of rotation of the driven shaft.

12. In a transmission of the class described, a driven shaft and a supplemental shaft disposed in spaced and parallel relation to the driven shaft, a power driven gear freely rotatable on one end of the driven shaft, another and similar gear adjacent said first named gear, a wide faced gear on the supplemental shaft meshing with both of the first named gears, two low speed driving units having gear surfaces arranged in spaced relation on the driven shaft and both meshing with a wide faced gear on the supplemental shaft, and another driving unit having a gear face meshing with the gear on the supplemental shaft and means for placing the first named gear and said driving units in operative engagement with said driven shaft.

13. In a transmission of the class described, a driven shaft and a supplemental shaft disposed in spaced and parallel relation to the driven shaft, a power driven gear freely rotatable on one end of the driven shaft, another and similar gear adjacent said first named gear, a wide faced gear on the supplemental shaft meshing with both of the first named gears, two low speed driving units having gear surfaces arranged in spaced relation on the driven shaft and both meshing with a wide faced gear on the supplemental shaft, another driving unit having a gear face meshing with the gear on the supplemental shaft and means for placing the first named gear and said driving units in operative engagement with said driven shaft, and a governor device on the driven shaft and cooperating with said second named gear.

In testimony that I claim the foregoing as my invention I have signed my name this 2nd day of July, 1928.

YUKIO KIKUCHI.